United States Patent
Brees et al.

(10) Patent No.: US 8,894,375 B2
(45) Date of Patent: Nov. 25, 2014

(54) SHIELDED STAMPED STATOR BLADE

(75) Inventors: William Brees, Akron, OH (US); Cem Ersahin, Copley, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 982 days.

(21) Appl. No.: 12/728,520

(22) Filed: Mar. 22, 2010

(65) Prior Publication Data
US 2010/0242467 A1 Sep. 30, 2010

Related U.S. Application Data

(60) Provisional application No. 61/210,975, filed on Mar. 25, 2009.

(51) Int. Cl.
*F04D 29/38* (2006.01)
*F16H 41/28* (2006.01)

(52) U.S. Cl.
CPC ............... *F16H 41/28* (2013.01); *Y10S 416/03* (2013.01)
USPC ............... 416/231 B; 416/DIG. 3; 416/197 C

(58) Field of Classification Search
USPC ..... 416/231 R, 231 A, 231 B, DIG. 3, 197 C, 416/180; 415/211.2, 191
See application file for complete search history.

(56) References Cited

U.S. PATENT DOCUMENTS

| | | | | |
|---|---|---|---|---|
| 1,770,575 A | * | 7/1930 | Ksoll | 244/212 |
| 2,637,487 A | * | 5/1953 | Sawyer | 415/115 |
| 2,834,573 A | | 5/1958 | Stalker | |
| 3,572,034 A | * | 3/1971 | Fisher | 60/341 |
| 2004/0237516 A1 | * | 12/2004 | Shin | 60/362 |
| 2007/0224042 A1 | * | 9/2007 | Brees et al. | 415/208.2 |

* cited by examiner

*Primary Examiner* — Edward Look
*Assistant Examiner* — Adam W Brown
(74) *Attorney, Agent, or Firm* — Simpson & Simpson, PLLC

(57) ABSTRACT

A blade for a stator in a torque converter including: a first blade segment connected to first inner and outer circumferential sections; a second blade segment, separately formed from the first blade segment, connected to second inner and outer circumferential sections, and including first and second portions; and a channel disposed between the first and second blade segments. In a circumferential direction, the first and second portions are separated by the channel.

10 Claims, 5 Drawing Sheets

SHIELDED STAMPED STATOR BLADE

CROSS-REFERENCE TO RELATED APPLICATIONS

This application claims the benefit under 35 U.S.C. §119(e) of U.S. Provisional Application No. 61/210,975, filed Mar. 25, 2009, which application is incorporated herein by reference.

FIELD OF THE INVENTION

The invention relates to blades for a stator, in particular, two-part blades for a stator for a torque converter.

BACKGROUND OF THE INVENTION

The prior art teaches the use of two-part blades for a stator for a torque converter.

BRIEF SUMMARY OF THE INVENTION

The present invention broadly comprises a blade for a stator in a torque converter including: a first blade segment connected to first inner and outer circumferential sections; a second blade segment, separately formed from the first blade segment, connected to second inner and outer circumferential sections, and including first and second portions; and a channel disposed between the first and second blade segments. In a circumferential direction, the first and second portions are separated by the channel.

In one embodiment, the second blade segment includes first and second radially disposed ends, the first radially disposed end is circumferentially aligned with the first blade segment and the second radially disposed end is circumferentially misaligned with the first blade segment.

In one embodiment, for a speed ratio of 0.0 for the stator, the blade is for enabling a flow of fluid for the stator through the channel. In one embodiment, for a speed ratio of 0.9 for the stator, the blade is for disabling a flow of fluid for the stator through the channel. In one embodiment, when an angle between a flow of fluid in the stator and an axial direction is less than a flow angle, the blade is for blocking a flow of fluid for the stator through the channel. In one embodiment, when an angle between a flow of fluid in the stator and an axial direction is greater than a flow angle, the blade is for enabling a flow of fluid for the stator through the channel.

The present invention also broadly comprises a blade for a stator in a torque converter, including: a first blade segment connected to first inner and outer circumferential sections and including first and second radially disposed sides; a second blade segment, separately formed from the first blade segment, connected to second inner and outer circumferential sections, and including a first radially disposed end circumferentially aligned with the first radially disposed side and a second radially disposed end axially aligned with the second radially disposed side; and a channel disposed between the first and second blade segments.

It is a general object of the present invention to provide a two-part blade for a stator in a torque converter that optimizes fluid flow through the stator.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
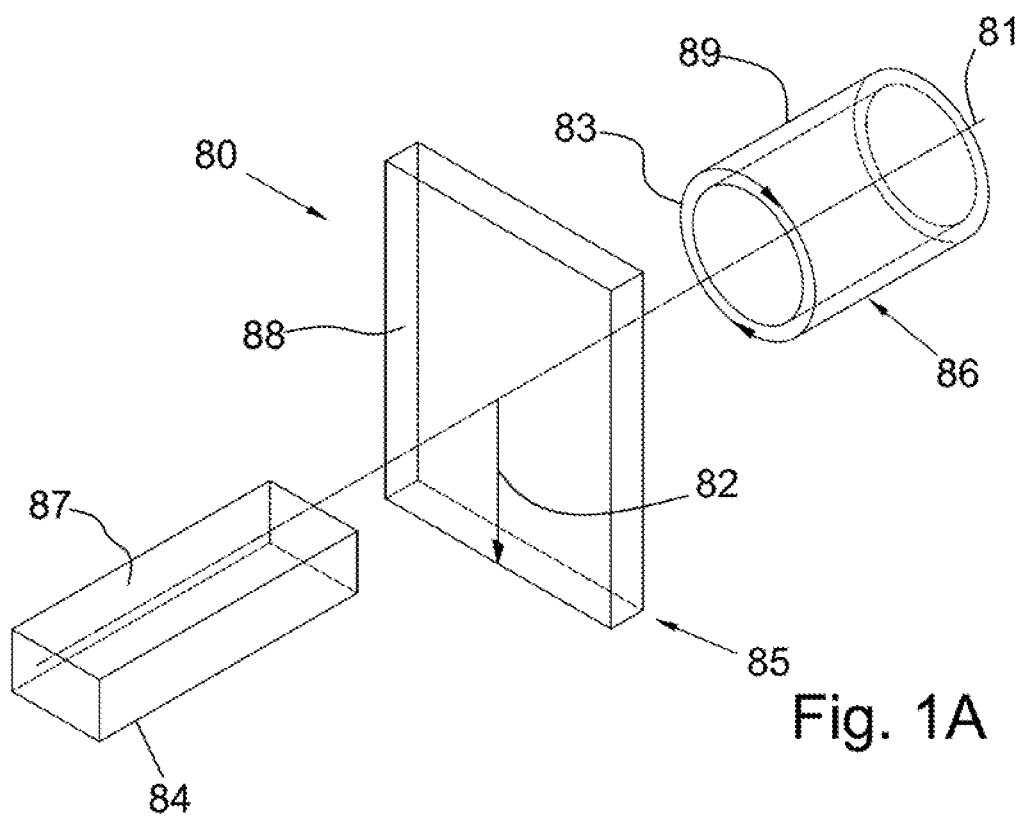
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
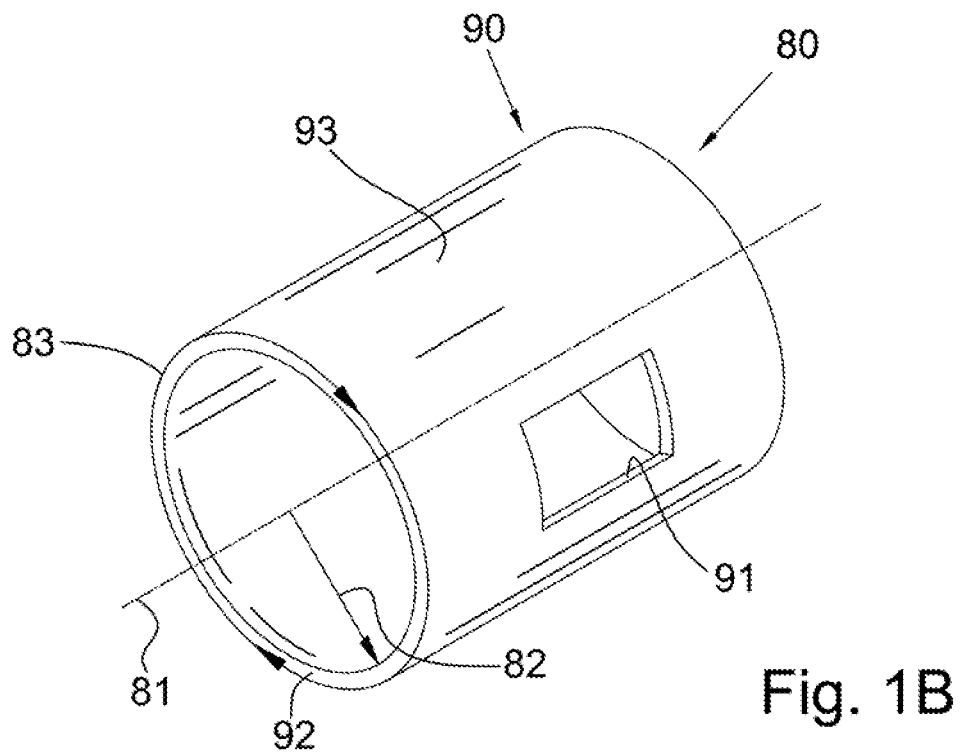
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
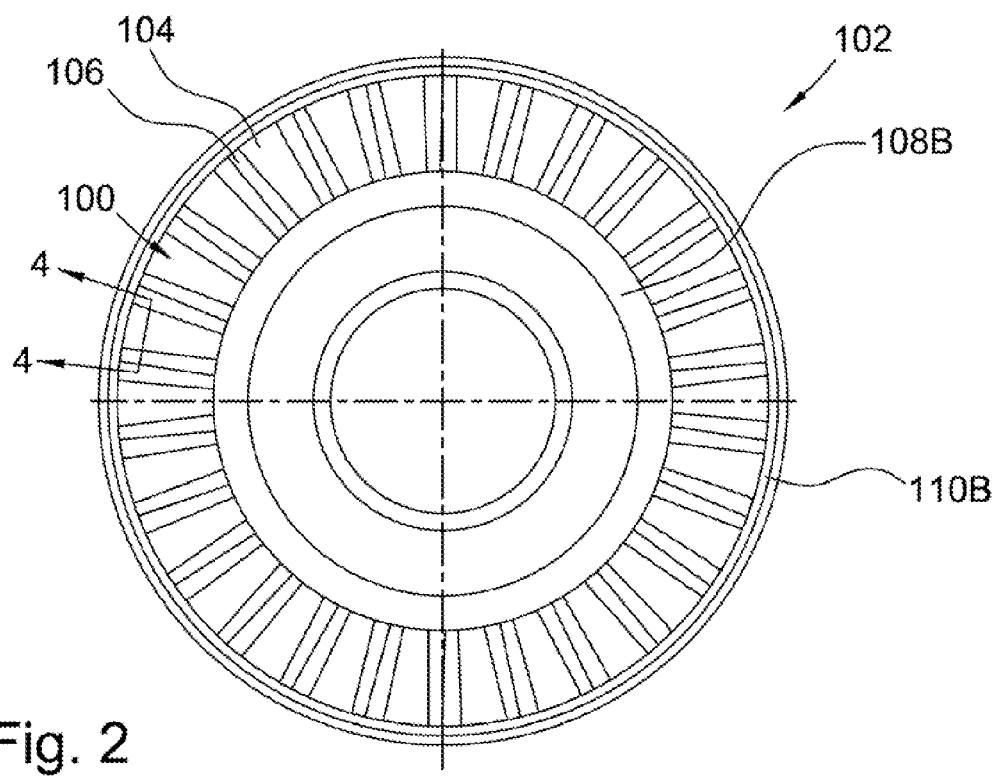
FIG. 2 is a front view of present invention blades in a stator.

FIG. 2 is a front view of present invention blades 100 in stator 102.

Figure 3:
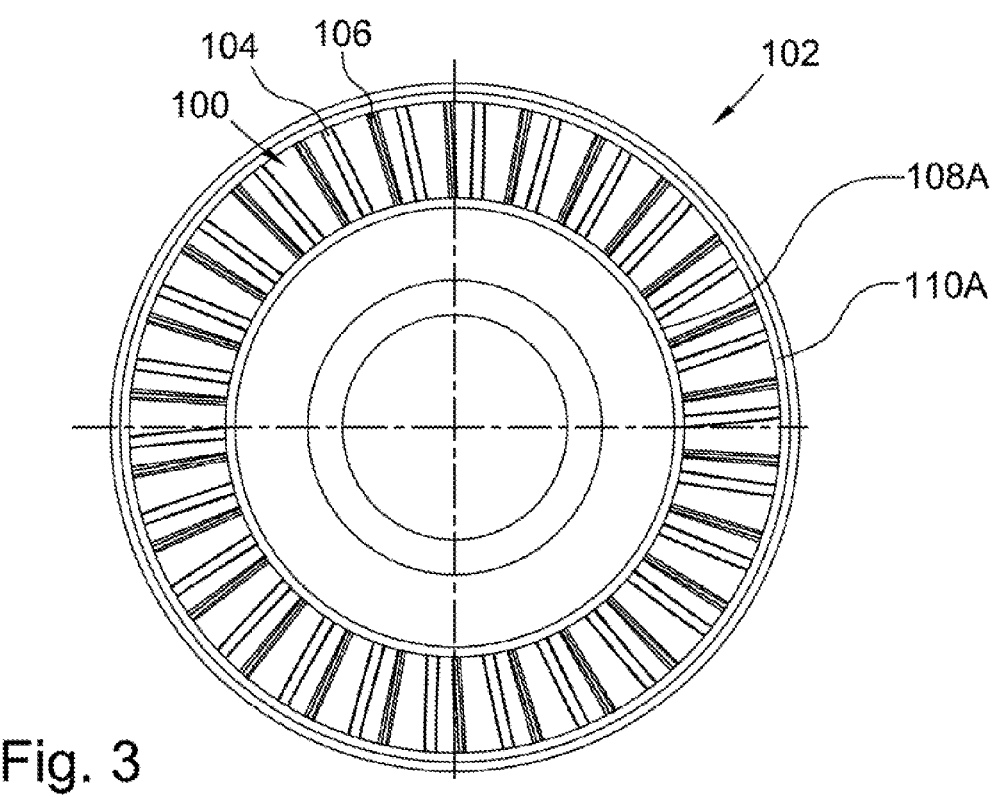
FIG. 3 is a back view of the stator shown in FIG. 2.

FIG. 3 is a back view stator 102 shown in FIG. 2.

Figure 4:
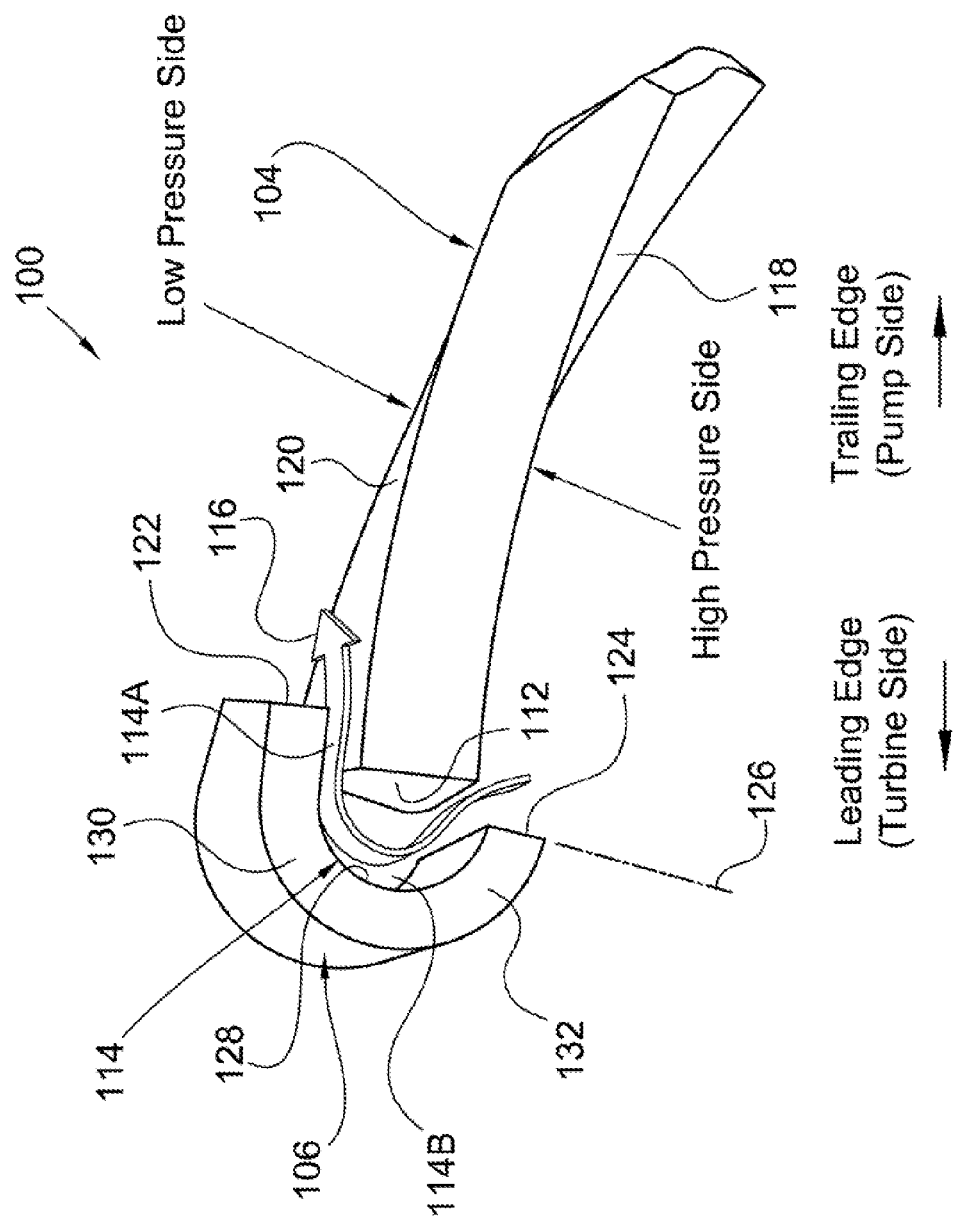
FIG. 4 is a cross-sectional view of a blade shown in FIG. 2 along line 4-4 in FIG. 2.

FIG. 4 is a cross-sectional view of blade 100 shown in FIG. 2 along line 4-4 in FIG. 2. The following should be viewed in light of FIGS. 2 through 4. Blade 100 in stator 102 includes blade segments 104 and 106. Blade segment 104 is connected to inner and outer circumferential sections 108A and 110A, respectively, of the stator. Blade segment 106 is connected to inner and outer circumferential sections 108B and 110B, respectively, of the stator. Blade segments 104 and 106 are formed separately, that is, the segments are separate and distinct pieces with respect to each other. In one embodiment, blade segment 104 is formed integral with circumferential sections 108A and 110A and blade segment 106 is formed integral with circumferential sections 108B and 110B. Segment 104 includes leading radially disposed edge 112. By radially disposed we mean that the end is substantially oriented in a radial direction, for example, between sections 108A and 110A. Segment 106 at least partially overlaps edge 112. Blade 100 also includes channel 114 disposed between segments 104 and 106.

A portion of the channel is circumferentially disposed between blade segments 104 and 106, for example, portion 114A of the channel and a portion of the channel also is axially disposed between blade segments 104 and 106, for example, portion 114B of the channel. Thus, the channel forms fluid flow path 116 communicating between radially disposed sides 118 and 120 of blade segment 104, as further described infra.

Blade segment 106 includes radially disposed ends 122 and 124. End 122 is circumferentially aligned with blade segment 104 and end 124 is circumferentially misaligned with end 122, for example, along line 126. Otherwise stated, blade segment 106 is at least partially axially aligned with radially disposed sides 118 and 120. Portions of blade segment 106 also can be described as including, a C-shaped curve, the C-shaped curve including surface 128 facing blade segment 104 and at least partially axially aligned with blade segment 104.

Blade segment 106 includes portions 130 and 132 at opposite ends of the blade segment. In a circumferential direction, portions 130 and 132 are separated by the channel. That is, segment 106 can be described as a "J" shape with portion 132 forming the curved "lower" part.

Figure 5A:
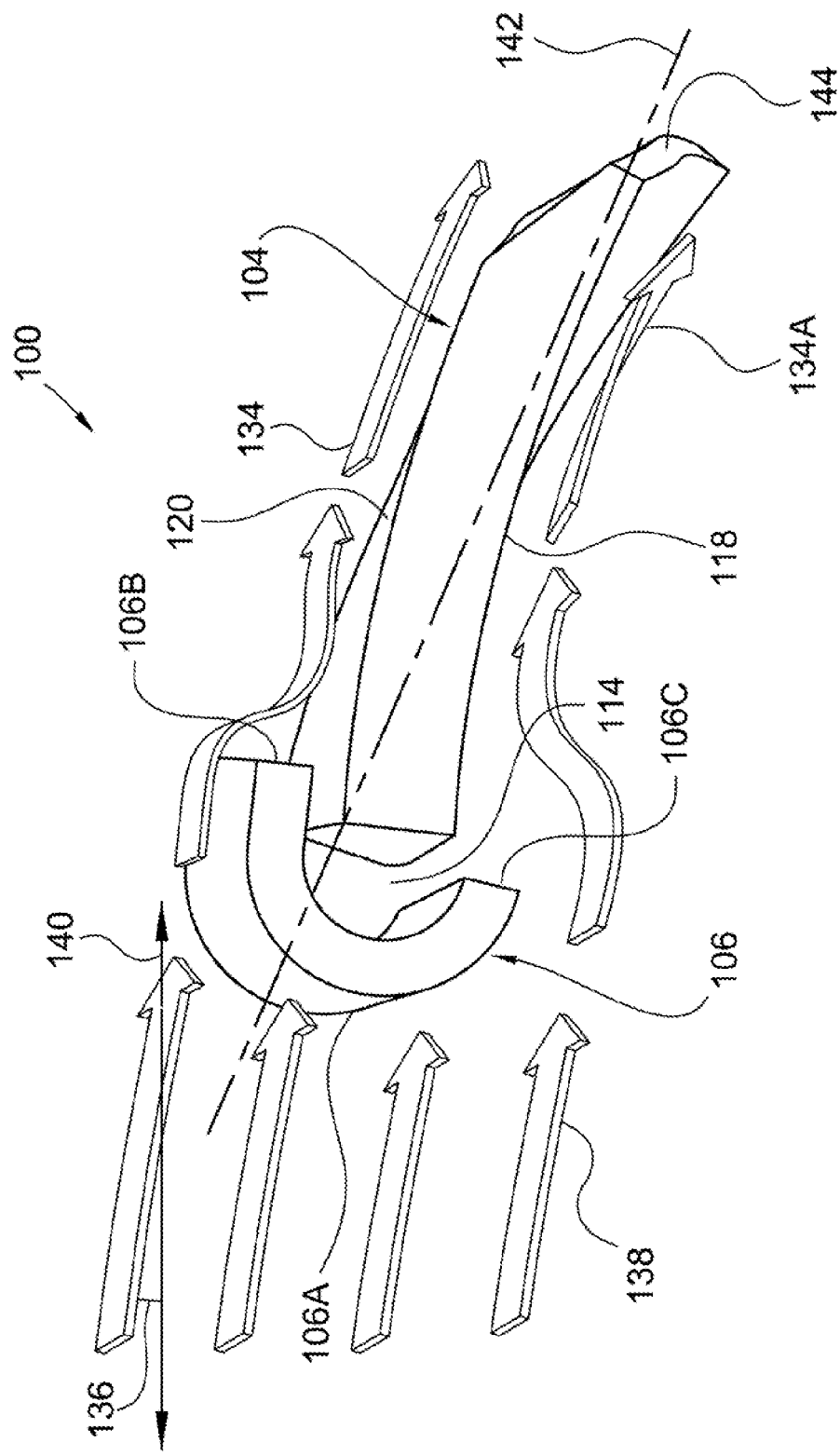
FIG. 5A is a cross-sectional view of the blade shown in FIG. 4 depicting fluid flow for a higher speed ratio; and, FIG. 5B is a cross-sectional view of the blade shown in FIG. 4 depicting fluid flow for a lower speed ratio.

FIG. 5A is a cross-sectional view of blade 100 shown in FIG. 4 depicting fluid flow for a higher speed ratio.

Figure 5B:
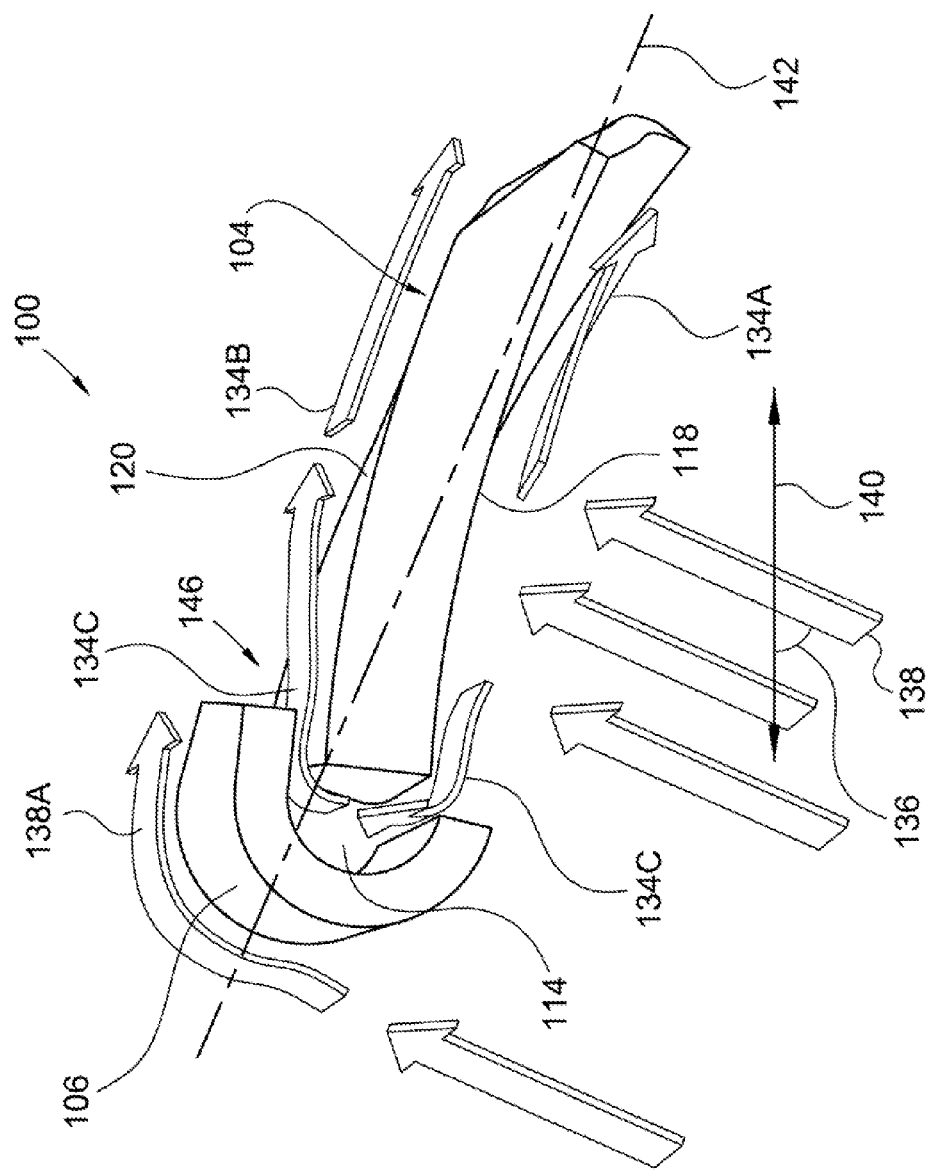

FIG. 5B is a cross-sectional view of blade 100 shown in FIG. 4 depicting fluid flow for a lower speed ratio. The following should be viewed in light of FIGS. 2-5B. Advantageously, blade 100 produces smooth fluid circulation through and around the blade during operation of the stator. For example, flow lines 134 are kept close to the surfaces of the blade, for example, along sides 118 and 120, thus optimizing flow of the fluid but also maintaining energy in the fluid flowing past and through the blades. By maintaining smooth fluid circulation, more fluid can be passed through the stator, which in turn increases the capacity and efficiency of a torque converter (not shown) in which the stator is installed.

In FIG. 5A, at a higher speed ratio, for example, 0.9, for the torque converter, angle 136 between fluid flow lines 138 for fluid from a turbine (not shown) and axial direction 140 is relatively small. Subsequently, the angle between fluid flow lines 138 and longitudinal axis 142 for blade segment 104 approaches zero degrees. Advantageously, in FIG. 5A, some of high-pressure high-velocity flow 138 is redirected along low pressure side 118 of the blade, for example, as shown by flow lines 134A. The redirection of flow 138 creates fluid flow in the desired direction towards the pump (not shown), that is, toward trailing edge 144 of blade segment 104. Flow lines 134A greatly reduce possible recirculation area at low pressure side 118, since flow lines 134A adhere closely to low pressure side 118 and the shape of blade segment 106 enables better flow adherence at leading edge 106A of blade 100. Thus, flow area is eased (recirculation area is reduced) and efficiency of the turning of the fluid is increased. In addition, a larger radius is possible with blade segment 106, for example, between edges 106B and 106C of blade segment 106. Such increase in radius causes fluid passing through the stator to remain attached to the shield for a greater distance along leading edge 106A; and therefore to be turned more towards the desired direction (toward edge 144 along sides 118 and 120), before separation occurs between the fluid and the sides.

In FIG. 5B, at a lower speed ratio, for example, 0.0, for the torque converter, also called. Stall, angle 136 is relatively large. Subsequently, the angle between fluid flow lines 138 and longitudinal axis 142 for blade segment 104 approaches 90 degrees. Because a larger radius is possible with blade segment 106, for example, between edges 106B and 106C of blade segment 106, fluid flow is able to attach around the shield with a minimum of recirculation, for example, as shown in flow lines 138A. The flow quickly transits from blade segment 106 to blade segment 104 and quickly attaches to sides 118 and 120, for example, as shown by flow lines 134B, since an angle between lines 138A and 134B is relatively small. On side 118, portions of flow 138 is directed toward trailing edge 144, for example, as shown by flow lines 134A, and portions of flow 138 is directed through channel 114, as shown by flow lines 134C. As flow lines 134C exit opening 146 of the channel, the flow lines are already adhering to side 120 and create a flow pattern that more quickly draws flow lines 138A to side 120. Thus, the flow around blade segments 106 and 104 is very smooth and efficient.

Thus, in one embodiment, for a higher speed ratio, for example, 0.9, for the torque converter, the blade is for blocking, or disabling, a flow of fluid, for example, flow lines 134C, for the stator through the channel. Thus, in one embodiment, for a lower speed ratio, for example, of 0.0, for the torque converter, the blade is for enabling a flow of fluid, for example, flow lines 134C, for the stator through the channel.

In one embodiment, blade segment 104 and inner and outer circumferential sections 108A and 110A are stamped from a single piece of material. In another embodiment, blade segment 106 and inner and outer circumferential sections 108B and 110B are stamped from a single piece of material. In one embodiment, blade segment 104 and inner and outer circumferential sections 108A and 110A are cast as a single piece. In another embodiment, blade segment 106 and inner and outer circumferential sections 108B and 110B are cast as a single piece. In one embodiment, blade segment 104, inner and outer circumferential sections 108A and 110A, blade segment 106, and inner and outer circumferential sections 108B and 110B are cast as a single piece.

Although stator 102 is shown with a specific number of blades 100, it should be understood that stator 102 is not limited to a particular number of blades 100. It should be understood that a present invention blade is not limited to the exact configuration and shape shown in the drawings and that other configurations and shapes are included in the spirit and scope of the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A blade for a stator in a torque converter, comprising:
   a first blade segment connected to first inner and outer circumferential sections;
   a second blade segment, separately formed from the first blade segment, connected to second inner and outer circumferential sections, and including:
     first and second radially disposed sides connected to the first inner and outer circumferential sections;
     a first radially disposed end connecting the first and second radially disposed sides; and,
     a second radially disposed end connecting the first and second radially disposed sides; and,
   a channel, wherein:
     a first line, oriented only in a circumferential direction:
       passes through the first radially disposed end or is co-linear with the first radially disposed end;
       passes through in sequence: the channel, the second radially disposed side, and the first radially disposed side; and,
     a second line, oriented only in the circumferential direction, passes through in sequence: the first radially disposed side, the second radially disposed side, the channel, the second radially disposed side and the first radially disposed side.

2. The blade of claim 1 wherein for a speed ratio of 0.0 for the stator, the blade is for enabling a flow of fluid for the stator through the channel.

3. The blade of claim 1 wherein for a speed ratio of 0.9 for the stator, the blade is for disabling a flow of fluid for the stator through the channel.

4. The blade of claim 1 wherein when an angle between a flow of fluid in the stator and an axial direction is less than a flow angle, the blade is for blocking a flow of fluid for the stator through the channel.

5. The blade of claim 1 wherein when an angle between a flow of fluid in the stator and an axial direction is greater than a flow angle, the blade is for enabling a flow of fluid for the stator through the channel.

6. The blade of claim 1 wherein:
   the first blade segment includes a third radially disposed end connecting third and fourth radially disposed sides; and
   a third line, oriented only in the axial direction, passes through the second radially disposed end and is off-set from the third radially disposed end in the circumferential direction.

7. A blade for a stator in a torque converter, comprising:
   a first blade segment connected to first inner and outer circumferential sections and including first and second radially disposed sides connected to the first inner and outer circumferential sections;
   a second blade segment, separately formed from the first blade segment and connected to second inner and outer circumferential sections; and,
   a channel disposed between the first and second blade segments, wherein a first line oriented only in a circumferential direction passes through in sequence: the first radially disposed side, the second radially disposed side, the channel, the second radially disposed side and the first radially disposed side.

8. The blade of claim 7 wherein:
   the first blade segment includes first and second radially disposed ends connecting the first and second radially disposed sides;
   the second blade segment includes a third radially disposed end connecting third and fourth radially disposed sides;
   a second line, oriented only in an axial direction, passes through the first radially disposed end and is off-set from the third radially disposed end in a first circumferential direction;
   a third line, oriented only in the axial direction, passes through the second radially disposed end and is off-set from the third radially disposed end in a second circumferential direction opposite the first circumferential direction; and,
   an entirety of the third radially disposed end is circumferentially located between the second and third lines.

9. A blade for a stator in a torque converter, comprising:
   a first blade segment connected to first inner and outer circumferential sections and including first and second radially disposed sides and a first radially disposed end connecting the first and second radially disposed sides;
   a second blade segment:
     separately formed from the first blade segment:
     connected to second inner and outer circumferential sections by third and fourth radially disposed sides: and including:
       a second radially disposed end connecting the third and fourth radially disposed sides; and
       a third radially disposed end including a surface:
         connecting the third and fourth radially disposed sides;
         facing the second radially disposed side in an axial direction;
         axially aligned with the second radially disposed side; and,
         forming a straight edge beginning at the third radially disposed side and extending in a straight line to the fourth radially disposed side;
   a channel disposed between the first and second blade segments, wherein:
     a first line, oriented only in an axial direction passes, through the second radially disposed end and the second radially disposed side;
     a second line, oriented only in a circumferential direction, passes through the third radially disposed end and the first and second radially disposed sides;
     the straight edge is co-linear with the second line; and, a third line, oriented only in the circumferential direction, passes through in sequence: the third radially disposed side, the fourth radially disposed side, the channel, the fourth radially disposed side and the third radially disposed side.

10. The blade of claim 9 wherein:
a fourth line, oriented only in the axial direction passes, through the second radially disposed end and is off-set from the first radially disposed end in a first circumferential direction;
a fifth line, oriented only in the axial direction, passes through the third radially disposed end and is off-set from the first radially disposed end in a second circumferential direction opposite the first circumferential direction; and,
an entirety of the first radially disposed end is circumferentially located between the fourth and fifth lines oriented only in the axial direction.

* * * * *